US012741327B2

(12) United States Patent
Chen

(10) Patent No.: US 12,741,327 B2
(45) Date of Patent: Sep. 22, 2026

(54) PIPE CUTTER WITH REPLACEABLE BLADE AND BLADE STORAGE

(71) Applicant: JS Products Inc., Las Vegas, NV (US)

(72) Inventor: Chungeng Chen, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 160 days.

(21) Appl. No.: 18/437,035

(22) Filed: Feb. 8, 2024

(65) Prior Publication Data

US 2024/0278341 A1 Aug. 22, 2024

Related U.S. Application Data

(60) Provisional application No. 63/447,458, filed on Feb. 22, 2023.

(51) Int. Cl.
*B23D 21/10* (2006.01)

(52) U.S. Cl.
CPC .................................... *B23D 21/10* (2013.01)

(58) Field of Classification Search
CPC ........ B23D 21/10; B23D 21/01; B23D 21/06; B23D 21/00; B23D 21/02; B23D 35/002; B23D 35/001; B23D 75/005; B23D 51/14; B26D 3/169; B26D 5/08; B26D 5/10; B26D 7/00
USPC .............................................................. 30/92
See application file for complete search history.

(56) References Cited

U.S. PATENT DOCUMENTS 2,582,736 A * 1/1952 Altieri ..................... B26B 17/00 30/178
3,772,783 A * 11/1973 Averitt .................... B26B 17/00 30/186
4,079,513 A * 3/1978 Harrison ................. B26B 17/00 30/193
4,434,555 A * 3/1984 Stoll ....................... B26B 17/00 30/92
4,831,732 A 5/1989 Garton
5,255,422 A * 10/1993 Russo ................ A61B 17/3217 29/268
5,285,576 A 2/1994 Taylor
(Continued)

FOREIGN PATENT DOCUMENTS

CA 3001354 A1 10/2018
CN 202572190 U 12/2012
(Continued)

*Primary Examiner* — Boyer D Ashley
*Assistant Examiner* — Fernando A Ayala
(74) *Attorney, Agent, or Firm* — Snell & Wilmer LLP

(57) ABSTRACT

A pipe cutter is configured to cut a pipe. The pipe cutter includes a first handle and a second handle coupled to the first handle and having a first cavity. The first and second handles are configured to move between open and closed positions with respect to each other. The pipe cutter further includes a blade assembly including a first blade coupled to the second handle and located in the first cavity of the second handle. The first blade is configured to cut the pipe responsive to the first and second handles moving from the open position to the closed position. The blade assembly further includes an insert and a replacement blade. The insert is coupled to the first blade, located in the first cavity, and has a second cavity. The replacement blade is coupled to the insert and is located in the second cavity.

19 Claims, 5 Drawing Sheets

(56) References Cited

U.S. PATENT DOCUMENTS 5,379,521 A * 1/1995 Lynders .................. B26B 29/04 30/233
5,475,924 A 12/1995 McDaniel
5,507,096 A * 4/1996 Gamba .................. B26B 27/00 30/186
5,625,951 A * 5/1997 Hamlin ................. B26B 11/005 30/131
5,870,828 A * 2/1999 Polites .................... B26B 5/001 30/162
5,890,293 A * 4/1999 Gamba .................. B26B 5/001 30/162
D431,765 S 10/2000 Huang
6,260,279 B1 7/2001 Apolinski et al.
D455,329 S * 4/2002 Renner ........................... D8/52
D556,528 S 12/2007 Huang
7,464,472 B2 12/2008 Kangas
D612,698 S * 3/2010 Huang ............................ D8/60
D640,520 S 6/2011 Rampling
7,966,734 B2 * 6/2011 Crain ...................... B26B 17/02 30/192
D675,499 S 2/2013 Faucher
8,573,099 B2 11/2013 Huang
8,601,697 B2 12/2013 Whittaker
D697,773 S 1/2014 Groten
8,898,911 B2 12/2014 Jordan et al.
9,216,465 B2 12/2015 Ronan
D795,034 S 8/2017 Steiner
9,744,679 B2 8/2017 Wang
D796,288 S 9/2017 Groten
D796,289 S 9/2017 Groten
D820,061 S * 6/2018 Ronan ............................. D8/55
10,046,470 B2 8/2018 Thorson
10,052,701 B2 8/2018 Zhou
10,059,018 B2 8/2018 Zhou
10,150,225 B2 12/2018 Hyma
10,259,132 B2 4/2019 Liao et al.
10,688,677 B2 6/2020 Xie
10,864,141 B2 12/2020 Doretti et al.
10,919,098 B2 2/2021 Hyma
11,077,574 B2 8/2021 Bell
11,224,925 B2 1/2022 Canis et al.
D943,374 S 2/2022 Groten et al.
11,285,551 B2 3/2022 Lee
D1,027,592 S 5/2024 Hyma
2005/0050735 A1 * 3/2005 Huang .................... B26B 17/00 30/186
2007/0050988 A1 * 3/2007 Di Bitonto ............. B26B 5/001 30/162
2008/0184566 A1 * 8/2008 Deter .................. B23D 29/026 30/252
2009/0100681 A1 * 4/2009 Tarpill ................. H02G 1/1224 30/90.1
2011/0000136 A1 * 1/2011 Brun .................. E05D 11/0081 49/358
2011/0185577 A1 8/2011 Ronan
2014/0290067 A1 * 10/2014 Ronan ..................... B26B 13/26 30/92
2018/0281023 A1 * 10/2018 Koch ....................... B25G 3/24
2020/0086511 A1 * 3/2020 Hayes .................... B26D 3/169
2020/0223086 A1 7/2020 Rampling
2021/0060670 A1 3/2021 Chen et al.
2021/0323177 A1 10/2021 Li
2022/0134526 A1 5/2022 Kaye
2022/0324124 A1 10/2022 Li
2022/0379390 A1 12/2022 Huang

FOREIGN PATENT DOCUMENTS

CN 205043819 U 2/2016
CN 113210718 A 8/2021
DE 2425771 A1 12/1975
DE 3708420 A1 9/1988
DE 10354846 B3 5/2005
EP 4052871 A2 9/2022
EP 4052871 A3 12/2022
FR 2867406 A1 9/2005
GB 2455367 A 6/2009
GB 2457346 B 3/2012
GB 2457447 B 3/2012
GB 2489706 B 12/2013
GB 2537051 A 10/2016
GB 2558990 B 1/2019

* cited by examiner 6
17
52
58
60
56
59
53
8
54
18
13
11
62
15

6
17
60
52
58
20
56
53
59
26
8
18
54
13
22
11
62
15

PIPE CUTTER WITH REPLACEABLE BLADE AND BLADE STORAGE

RELATED APPLICATION DATA

This application claims priority to U.S. Provisional Patent Application Ser. No. 63/447,458, filed Feb. 22, 2023. The present application claims priority to said application and incorporates by reference said application as if set forth fully herein.

FIELD OF THE INVENTION

The present invention relates to pipe cutting devices.

BACKGROUND OF THE INVENTION

Pipe cutters are known in the art. One variation of these pipe cutters uses a blade to cut the pipe. In one common variation of such a pipe cutter, in order to simplify the pipe cutter to make it simple to manufacture and have a lower cost, the cutter includes a molded tool body for gripping by a user, and to ensure that the blade is rigidly mounted, the cutting blade is permanently located into the tool body. This configuration, however, has the disadvantage that once the cutting blade is worn, the entire tool must be discarded. This requires the user to then purchase an entirely new cutting tool, and both additional expense and time to the user.

It is with respect to these and other considerations that the instant disclosure is concerned.

SUMMARY OF THE INVENTION

One aspect of the invention is directed to a pipe cutter. The pipe cutter comprises a first handle and a second handle each having a jaw portion and an opposing engagement portion. The first and second handles are coupled to one another, preferably in a manner in which the jaw portions may be moved towards and away from one another (e.g., move between open and closed positions). The pipe cutter further includes a blade assembly including a first cutting blade coupled to the second handle, such as located in a first cavity of the second handle and extending outwardly therefrom towards the first handle. The first blade is configured to cut the pipe responsive to the first and second handles moving from the open position to the closed position.

The pipe cutter also preferably includes a storage area for at least one replacement cutting blade. In one embodiment, the blade assembly further includes an insert and a replacement cutting blade. The insert is coupled to the first blade, is preferably located in the first cavity, and defines a second cavity. The replacement blade is coupled to the insert and is located in the second cavity.

Further objects, features, and advantages of the present invention over the prior art will become apparent from the detailed description of the drawings which follows, when considered with the attached figures.

DESCRIPTION OF THE DRAWINGS

FIGS. 7 and 8 are different section views of the pipe cutter of FIG. 5, wherein FIG. 7 is shown without a guard member, and FIG. 8 is shown with the guard member.

DETAILED DESCRIPTION OF THE INVENTION

Figures 1, 2:
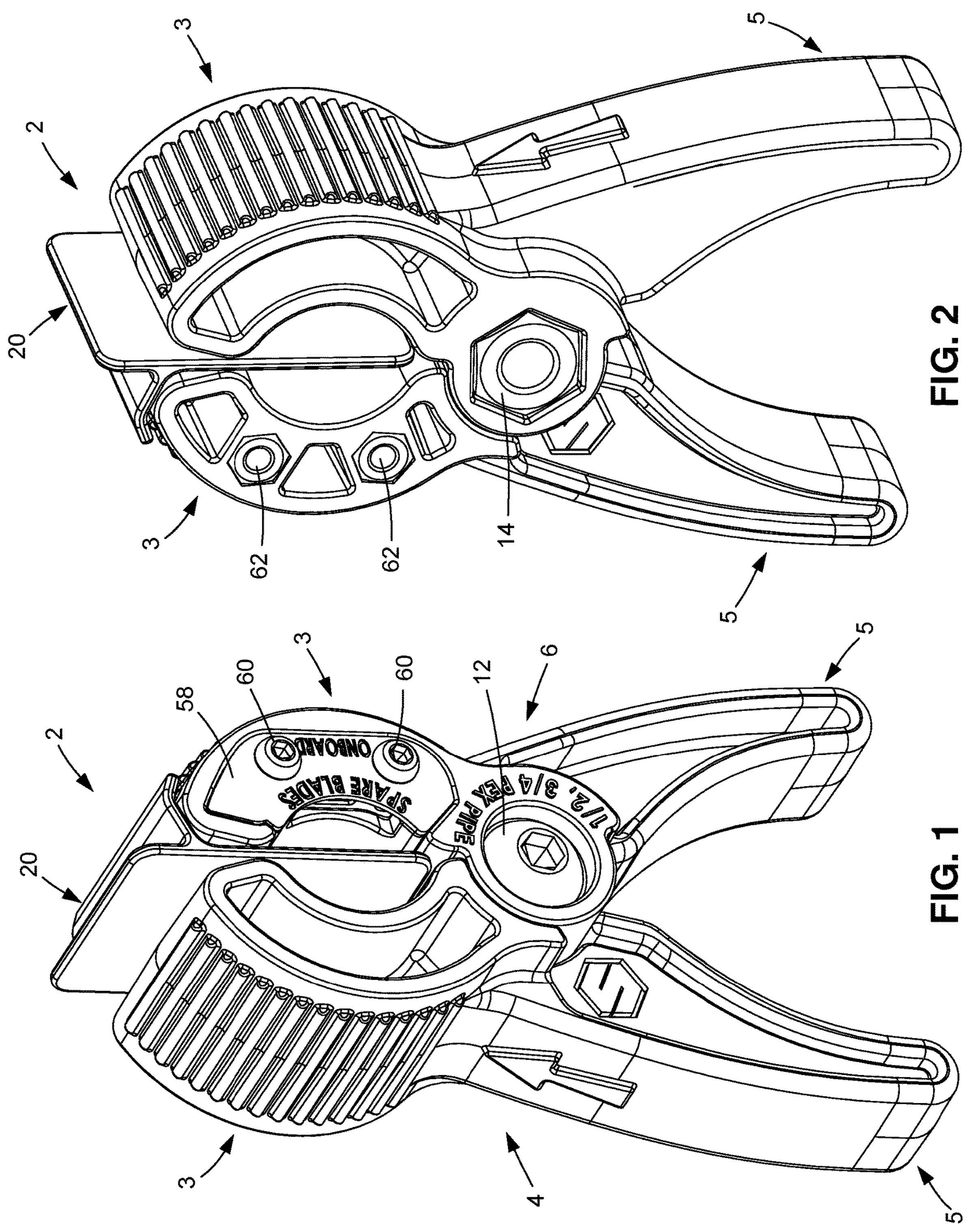
FIGS. 1 and 2 are different isometric views of a pipe cutter, in accordance with one non-limiting embodiment of the disclosed concept.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As employed herein, the term "coupled" shall mean connected together either directly or via one or more intermediate parts or components.

As employed herein, the term "number" shall mean one or an integer greater than one (i.e., a plurality).

One embodiment of the invention is a pipe cutter 2, as shown in FIGS. 1-5. The pipe cutter 2 includes a first handle 4 and a second handle 6 coupled to the first handle 4, preferably in a manner in which the first handle 4 and the second handle 6 are movable (such as pivotal) relative to one another. The first and second handles 4 and 6 may be made of suitable materials including metallic materials, monomeric materials, polymeric materials, or mixtures thereof. In one configuration, the first and second handles 4 and 6 each have a jaw portion 3 at one end, and an engaging portion 5 at an opposing end.

The first and second handles 4 and 6 are generally mirror images of one another, but for the configuration of the second handle 6 to mount a cutting blade and provide for replacement blade storage. That is, as will be discussed below, coupled to the second handle 6 are a first blade 54 (e.g., a primary cutting blade), as well as a number (one or more) of replacement blades 56 configured for simple and reliable later use, should the primary first blade 54 become damaged or worn out. This arrangement substantially minimizes and/or eliminates the need for users to spend large amounts of time looking for replacement blades.

Figure 5:
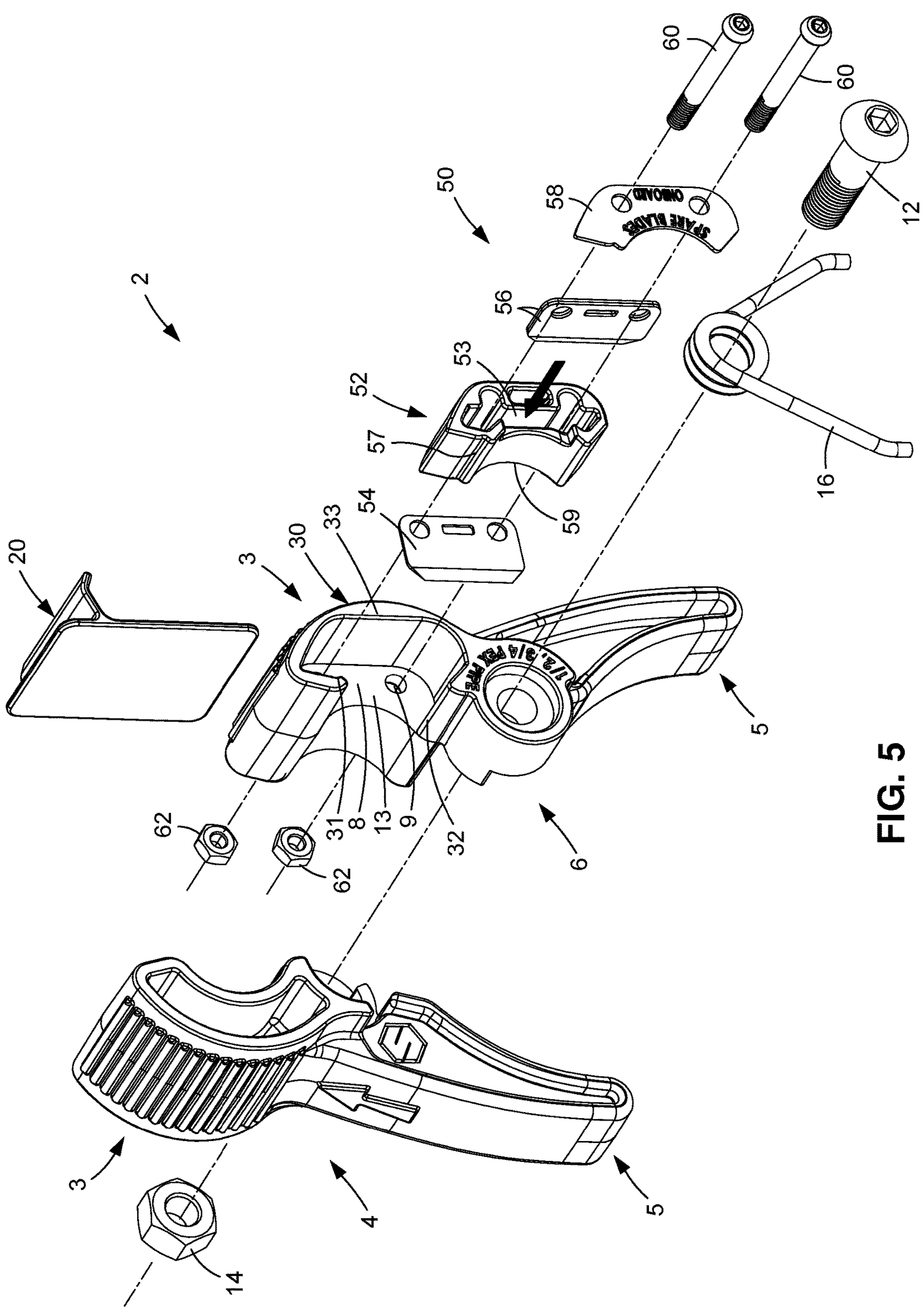
FIG. 5 is an exploded isometric view of the pipe cutter of FIGS. 3 and 4.

In one configuration, the first and second handles 4 and 6 are rotatably coupled together via coupling members (e.g., without limitation, a bolt 12 and a nut 14), such as between their jaw and engaging ends, and have their jaw ends or portions biased towards each other via a biasing member (e.g., spring 16). The first and second handles 4 and 6 may be configured to move between open and closed positions with respect to each other, and the spring 16, which is preferably coupled to the second handle 6, may be configured to bias the first and second handles 4 and 6 toward the closed position, such as via leg portions of the spring 16 engaging the two handles. As shown in FIG. 5, it will also be appreciated that the spring 16 may be connected to the pipe cutter 2, such as by the bolt 12 extending through the spring 16 and each of the first and second handles 4 and 6.

In accordance with the disclosed concept, and as will be discussed in greater detail below, the pipe cutter 2 further includes a blade assembly 50 that is associated with, such as being coupled to, the second handle 6, preferably at the jaw portion thereof. As shown most clearly in FIG. 5, the blade assembly 50 includes an insert 52, a first blade 54, a number of replacement blades 56, a cover plate 58 coupled to the insert 52, and a number of coupling members (e.g., bolts 60 and nuts 62).

The insert 52 may be made of suitable materials including metallic materials, monomeric materials, polymeric materials, or mixtures thereof. The blades 54 and 56 are preferably metallic and are configured to cut pipe, and preferably plastic pipe, such as cross-linked polyethylene (or PEX) pipe. Furthermore, the second handle 6 preferably has a cavity 8 (e.g., a recessed region) at the jaw portion thereof. Preferably, the cavity 8 extends into the second handle 6 at one side thereof (e.g. laterally). As illustrated, the cavity 8 is not fully enclosed, but has one open side which corresponds to the outside of the second handle 6, and an open slot which faces towards the first handle 4 (which slot allows the first cutting blade 54 to be located in the cavity 8 and extend outwardly of the second handle 6 towards the first handle 4, as described in more detail below).

The jaw portion of the second handle 6 may further have a number of thru holes or passages 9. As such, it will be appreciated that the blade assembly 50 is configured to be located in the cavity 8 in a convenient manner and coupled to the second handle 6. In one example, the insert 52 and the cover plate 58 are shaped to correspond to the shape of the jaw portion of the second handle 6, and also to match the corresponding end of the first handle 4. See FIG. 4, for example, wherein the shape of the cover plate 58 substantially mirrors a shape of the jaw end of the first handle 4. See also FIG. 5, for example, wherein a perimeter of the cover plate 58 is shaped the same as a perimeter of the insert 52.

Figure 6:
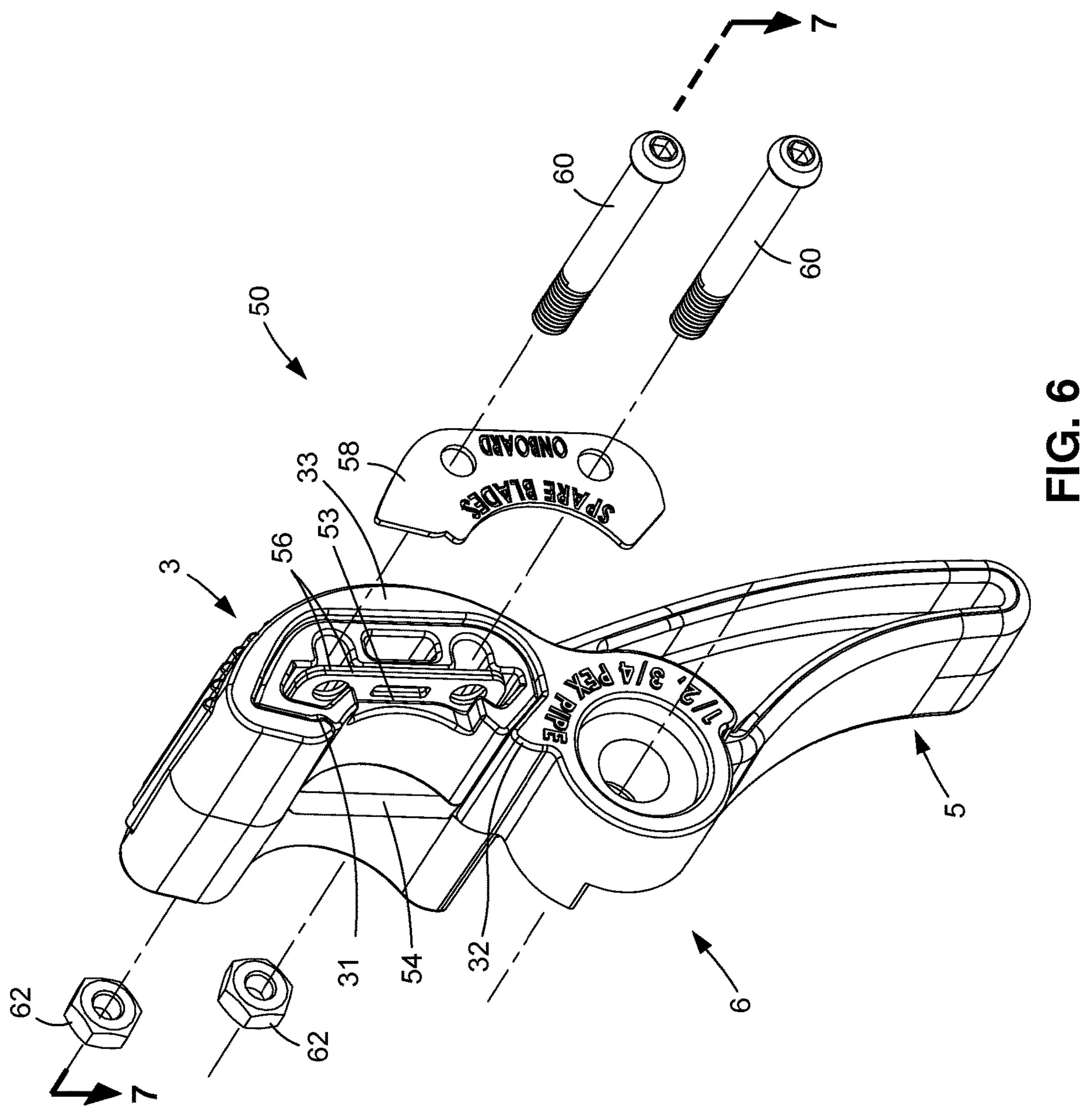
FIG. 6 is an exploded isometric view of a portion of the pipe cutter of FIG. 5.

Referring to FIG. 5, the second handle 6 may include a C-shaped portion 30 defining the cavity 8. The C-shaped portion 30 preferably includes a first end 31, a second, opposing end 32, and a receiving portion 33 extending therebetween. It will be appreciated that the first and second ends 31 and 32 prevent the insert 52 from moving out of the cavity 8 towards the first handle 4. Accordingly, the insert 52 has an outer profile that is the same as an inner profile of the receiving portion 33. Notice, for example, the continuous edge in FIG. 6 where these two components join. As a result of the sameness of profiles, the insert 52 is advantageously able to nest within the receiving portion 33.

Referring again to FIG. 5, the insert 52 is further provided with a feature to maintain engagement with the second handle 6. For example, the outer profile of the insert 52 preferably has a corner region (e.g., 80-to-100-degree corner region 57). In one example, the first end 31 of the C-shaped portion 30 engages the corner region 57 in order to maintain the insert 52 in the cavity 8.

Referring again to FIGS. 7 and 8, in one example the first blade 54 is preferably coupled to the second handle 6 and located in the cavity 8 such that it extends perpendicularly toward the first handle 4. The first blade 54 may be configured to cut pipe responsive to the first and second handles 4 and 6 moving from the open position to the closed position. Additionally, the insert 52 may be coupled to the first blade 54, and also has a cavity 53 which acts as a blade storage area for the replacement blade(s) 56. As such, it will be appreciated that the replacement blades 56 may be coupled to the insert 52 and located in the cavity 53.

Figures 7, 8:
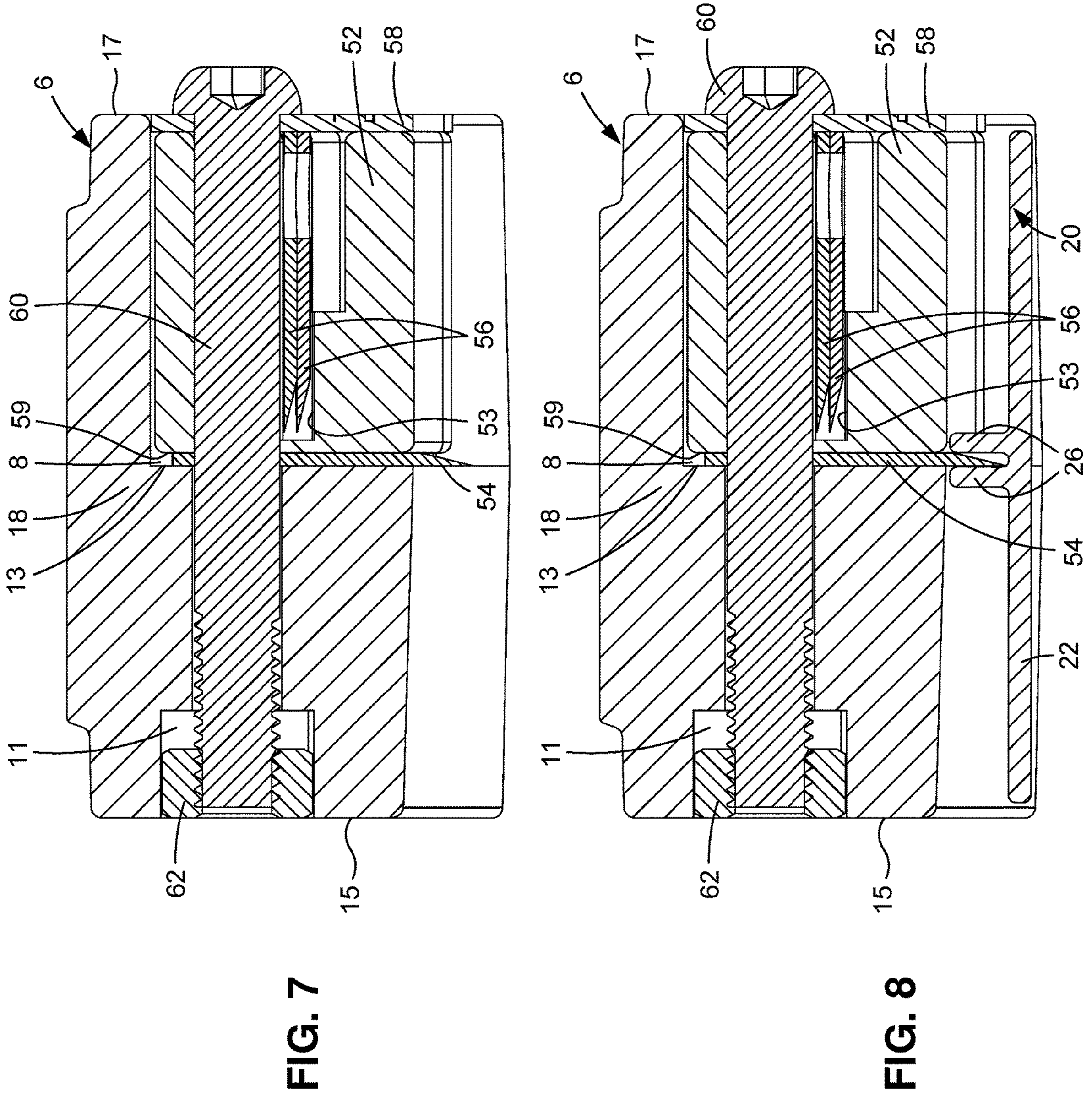

In one space-saving configuration, the cavity 53 is configured to receive the replacement blades 56 in a horizontal orientation. For example, the replacement blades 56 are each preferably located perpendicular to an orientation of the first blade 54 as well as perpendicular to the cover plate 58, as shown in FIGS. 7 and 8. This allows the space of the cavity 8 to be utilized to both support the first blade 54 and also store the replacement blades 56.

The insert 52 may also have a distal surface 59 and the second handle 6 may have a surface 13 defining a distal portion of the first cavity 8. Furthermore, the first blade 54 is configured to engage each of the surfaces 13 and 59. In this manner, the first blade 54 is configured to be located parallel to each of the surfaces 13 and 59 and be located therebetween, in one example located therebetween via a press-fit engagement. As such, it will be appreciated that the blade assembly 50 is configured to provide the pipe cutter 2 with cutting capabilities (e.g., via the first blade 54) and also blade storage capabilities (e.g., via the replacement blades 56).

More specifically, the first blade 54 is configured to be secured in the cavity 8 of the second handle 6 in a manner perpendicular to an axis of a pipe (e.g., during opening and closing of the pipe cutter 2, a plane of the first blade 54 is beneficially located perpendicular to a longitudinal axis of a pipe that is being cut). For example, the second handle 6, the first blade 54, the insert 52, and the cover plate 58 each have a number (e.g., 2) of thru holes (e.g., only one of the thru holes 9 is labeled in FIG. 5). The thru holes of the insert 52 may coincide with the cavity 53, in one example. Further, the bolts 60 (or other fasteners) are configured to extend through each of these thru holes in order to couple the blade assembly 50 to the second handle 6.

In this configuration, the insert 52 is located against the first blade 54 and aids in positioning/mounting the first blade 54 in its cutting position. Preferably, the fasteners 60 each thread into the second handle 6 and thus tighten the cover 58 against the insert 52, the insert 52 against the first cutting blade 54, and the first cutting blade 54 against the surface 13 of the handle.

In this manner, the first blade 54 is configured to cut pipe responsive to opening and closing the first and second handles 4 and 6 such that in use, a user may squeeze the engaging end of the handles 4 and 6 towards one another to open the jaws of the pipe cutter 2 to place them around a pipe to be cut, and then release the handles to engage the first blade 54 with the pipe which is then positioned between the first blade 54 and the jaw of the first handle 4. The user may turn the pipe or the pipe cutter 2 to cause the first blade 54 to cut the pipe via circumferential engagement of the blade 54 with the pipe. In a preferred embodiment, the user places the pipe cutter 2 on the pipe and then turns the cutter in the direction of the arrows shown on the handles (e.g. clockwise in the case of FIGS. 3 and 4). This direction of movement ensures that the pipe being cut stays seated in the jaws of the first and second handles 4 and 6, to ensure a complete cut all of the way around the pipe.

In accordance with the disclosed concept, if the first blade 54 is damaged during use or becomes excessively worn, rather than having to locate a replacement blade that may be stored at a distant location (e.g., at an owner's garage or at a hardware store), the pipe cutter 2 provides a convenient mechanism for replacement blades (e.g., the replacement blades 56) to be made readily available. In one example, and as shown most clearly in FIG. 6, the replacement blades 56 are located in the cavity 53 of the insert 52 in a manner wherein a plane of the replacement blades 56 is located parallel to a longitudinal axis of the bolts 60 and perpendicular to a plane of the first blade 54.

Additionally, once the blades 54 and 56 (FIG. 5) are in the cavity 8, the cover plate 58 is configured to be coupled to the insert 52 such that the replacement blades 56 are located between the first blade 54 and the cover plate 58 (see FIGS. 7 and 8). See FIG. 1, for example, which shows the cover plate 58 secured to the second handle 6 via the bolts 60. As such, it will be appreciated that when the pipe cutter 2 is assembled, the bolts 60 extend through the cover plate 58, through the insert 52, through the first blade 54, and through the holes 9 of the second handle 6 in order to secure the blade assembly 50 to the cavity 8. Accordingly, when the pipe cutter 2 is assembled, the cover plate 58 is preferably located in a plane that is parallel to the first blade 54, perpendicular to a plane of the replacement blades 56, and perpendicular to longitudinal axes of the bolts 60.

Referring to the sectional views of FIGS. 7 and 8, the second handle 6 further has at least one cavity 11 located on a side opposite a side engaging a head of the bolts 60 (e.g., opposite the first cavity 8 of the second handle 6). As shown, the bolts 60 extend through the first cavity 8 and into the additional cavity 11, and the nuts 62 are coupled (e.g., threadably coupled) to the bolts 60 and located in the additional cavity 11 in a recessed manner such that the nuts 62 are at least partially located internal with respect to the second handle 6. Thus, the cavities 11 receive the nuts 62 in an ergonomic manner such that the nuts 62 are generally located inside (e.g., encapsulated on all but one side) the second handle 6, and are either flush with an outside surface of the second handle 6 or are spaced a distance from an exterior surface thereof toward an interior of the pipe cutter 2. In one configuration, this prevents the nut 62 from rotating when the bolt 60 is engaged therewith, eliminating the need for the user to engage a tool with the nut to keep it from rotating.

Continuing to refer to FIGS. 7 and 8, as shown, the replacement blades 56 are stored in the cavity 53 of the insert 52 and are located perpendicular to the first blade 54. In this manner, the replacement blades 56 do not interfere with use of the pipe cutter 2. However, if/when the first blade 54 becomes damaged or is otherwise worn out, a user can simply de-couple the bolts 60 from the nuts 62, and remove one of the replacement blades 56 from the cavity 8.

Subsequently, one of replacement blades 56 may be placed into a cutting position (e.g., a position where the first, and damaged blade 54 formerly was), and the rest of the remaining blade assembly 50 can be assembled back into the cavity 8 via the bolts 60 and the nuts 62. Thus, a user of the pipe cutter 2 can quickly and easily change out a damaged blade (e.g., the first blade 54) with another blade (e.g., one of the replacement blades 56) without having to spend time looking for a replacement blade, going to a hardware store, or otherwise.

In the configuration described, replacement blade storage is defined by an insert for the jaw portion of the second handle. In alternative embodiments, the storage area might be defined by the second handle itself and/or the cutting blade 54 might be separately mounted to the second handle 6 (e.g. independently of the insert 52). However, an advantage to the configuration of the invention is that the insert 52 serves to both define the replacement blade storage, and also act as a stop for the cutting blade 54. In particular, in the configuration described and illustrated, the cutting blade 54 is trapped or captured between the wall of the second handle 6 and the insert 52, maintaining it tightly in a cutting position.

In the configuration described, access to the blade storage area or cavity 53 of the insert 52 is from a side that faces away from the second handle 6, so that the cover plate 58 is used to close the cavity 53 and prevent the replacement blades 56 from falling out. In another embodiment (not shown), a cavity could be defined at the opposite side (e.g. facing the wall of the second handle 6), thus eliminating the need for the cover 58.

Further, the coupling member or members which are used to selectively couple the insert 52 to the second handle 6 might comprise a number of mechanisms other than nuts and bolts. For example, one or more biased clips might be provided on the second handle 6. When the insert 52 is inserted into the cavity 8 of the second handle 6, the clips might move into a position in which they engage a face portion of the insert 52, preventing it from sliding out of the cavity 8, unless the user presses upon the clips to move them out of the way.

It will also be appreciated that while in one embodiment the pipe cutter 2 includes a blade assembly associated with the second handle 6, the first handle 4 might similarly define a cavity for housing one or more replacement blades, such as in association with an insert which can be located in the cavity or by locating the blades in the cavity and then closing the cavity with a cover.

Additionally, in one preferred configuration of the invention, the pipe cutter 2 also includes a mechanism to protect users from inadvertent contact with cutting edges of the blades 54 and 56. More specifically, and referring to FIGS. 3 and 4, in one example embodiment, the pipe cutter 2 further has a guard member 20 that is configured to be removably coupled to the second handle 6 and configured to cover a cutting edge of the first blade 54.

Figures 3, 4:
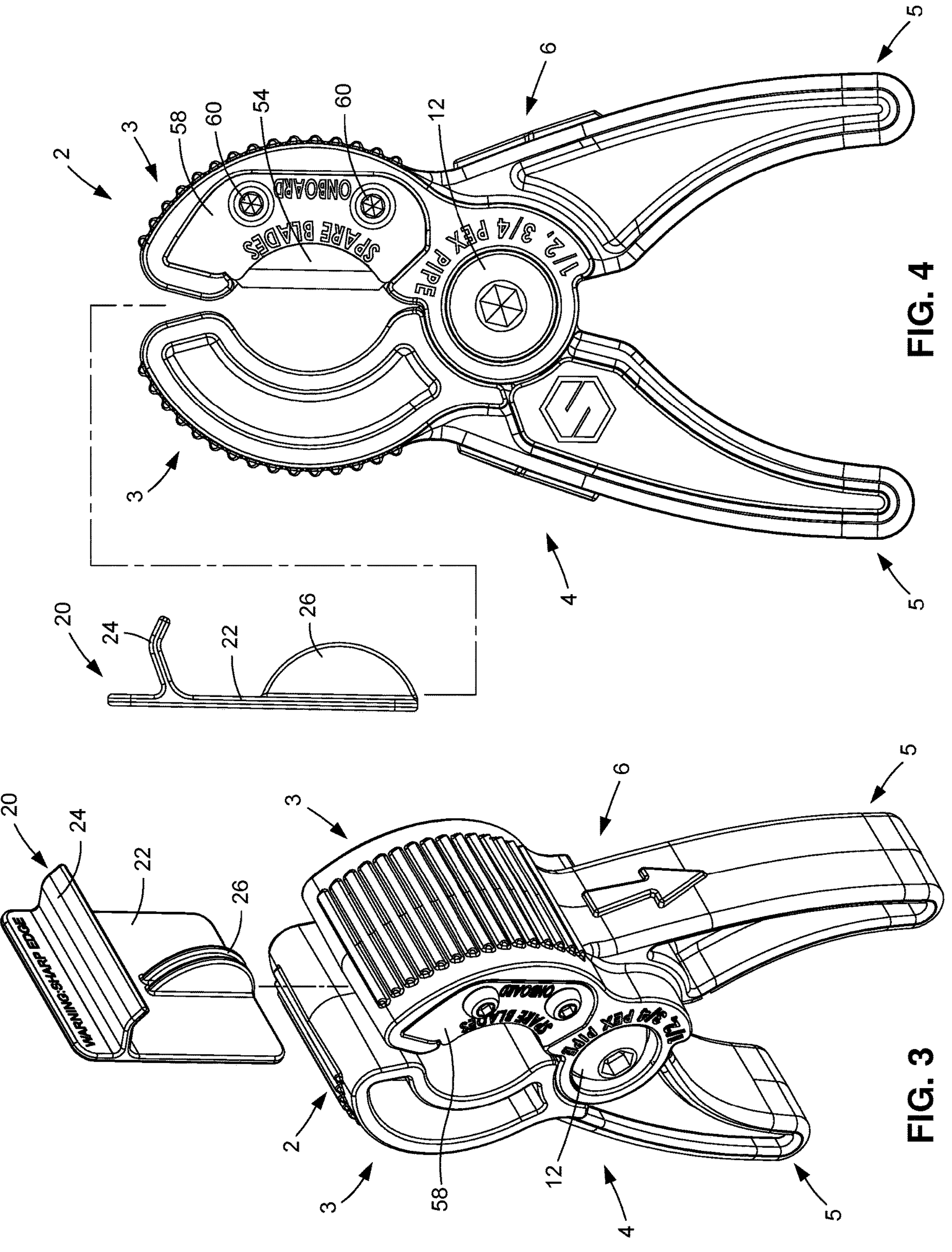
FIGS. 3 and 4 are different exploded views of the pipe cutter of FIGS. 1 and 2.

As shown in the exploded view of FIG. 3, the guard member 20 has a generally planar-shaped body portion 22, a clip member 24 extending from a top of the body portion 22, and a pair of retention members 26 extending outwardly from and being located perpendicular to the body portion 22. The guard member 20 may, in one example, be a unitary component made from a single piece of material (e.g., an injection molded piece). When the pipe cutter 2 is assembled (e.g., as shown in FIGS. 1 and 2), the clip member 24 is configured to be removably coupled to a top portion of the second handle 6 in a position such that the first blade 54 extends between the pair of retention members 26. As such, and in accordance with the disclosed concept, even if the first and second handles 4 and 6 move between open and closed positions, the guard member 20 substantially covers the first blade 54 such that a user of the pipe cutter 2 would be protected from undesirable injury.

As shown in FIG. 8, when the clip member 24 is coupled to the top of the second handle 6, the cutting edge of the first blade 54 is located between the pair of retention members 26 and is covered and protected by the retention members 26, thereby protecting users before and after using the pipe cutter 2 to cut pipe. It will be appreciated that each of the pair of retention members 26 is preferably half-circle shaped in order to cover the cutting edge and engage with a corresponding curved portion of the second handle 6. Also as shown in FIG. 8, when the clip member 24 of the guard member 20 is coupled to the top of the second handle 6, the body portion 22 is located perpendicular to the first blade 54. Accordingly, in the position of the pipe cutter 2 depicted in FIGS. 1 and 2, the guard member 20 and the second handle 6 substantially and/or entirely encapsulate the first blade 54 on all sides.

Moreover, when a user desires to cut pipe with the pipe cutter 2, the user can simply remove the guard member 20 from the second handle 6, thus exposing the first blade 54. As such, it will be appreciated that the clip member 24 of the guard member 20 may be coupled (e.g., when in a protective non-use state) to a top portion of the second handle 6 via a snap-fit mechanism. Additionally, the retention members 26 are configured such that when the first blade 54 is being covered thereby, the first blade 54 may press each of the retention members 26 slightly outwardly with respect to each other, such that the retention members 26 substantially and securely cover the first blade 54 (e.g., the first blade 54 is located between the retention members), thus protecting a user from undesirable exposure. In other example embodiments, other protective mechanisms for a guard member besides the retention members 26 are contemplated herein. For example, a suitable alternative guard member may simply have a planar portion such as portion 22, which extends over and substantially covers the first blade 54.

Additionally, the guard member 20 is uniquely structured to guard a user from the first blade 54. More specifically, when the guard member 20 is coupled to the second handle 6, the retention members 26 are preferably each located in corresponding planes that are located parallel to a plane of the first blade 54 and parallel to a plane of the cover plate 58. Similarly, when the guard member 20 is coupled to the second handle 6, the planar portion 22 is preferably located in a plane perpendicular to a plane of the first blade 54, thus providing for a relatively reliable manner of guarding the user from the first blade 54. Furthermore, as shown in FIG. 4, the retention members 26 correspond in shape to an exposed shape of the first blade 54. For example, a blade edge of the first blade 54 may be linear and substantially coincide with an edge of the retention members 26 that extend from the planar portion 22. Similarly, the circular-shaped edges of the retention members 26 may substantially coincide with the edge of the first blade 54 that extends from the second handle 6.

Referring again to FIGS. 7 and 8, it will also be appreciated that the pipe cutter 2 is configured transport the replacement blades 56 while still being configured to cut pipe with the first blade 54 in a desirable manner. For example, in one embodiment centrally disposing the first blade 54 on the second handle 6 is desirable. Thus, as shown, the second handle 6 may include a first side 15, a second side 17, and a middle 18 located midway between the first and second sides 15 and 17. As shown, the first blade 54 is preferably located on the middle 18, thereby allowing for desirable cutting. Additionally, the blade assembly 50 advantageously does not interfere with this arrangement, at least because the insert 52 extends from the first blade 54 to at or about the second side 17, and the guard member 20 extends from the first side 15 to the second side 17. Furthermore, the cover plate 58 preferably extends from the second side 17 inwardly with respect to the cavity 8 to the insert 52, thereby allowing the second handle 6 and blade assembly 50 to maintain an ergonomic footprint, as compared to the first handle 4.

It will be understood that the above-described arrangements of apparatus and the method there from are merely illustrative of applications of the principles of this invention and many other embodiments and modifications may be made without departing from the spirit and scope of the invention as defined in the claims.

What is claimed is:

1. A pipe cutter configured to cut a pipe, the pipe cutter comprising:

a first handle having a jaw end and an engaging end;

a second handle having a jaw end and an engaging end, the first and second handles rotatably coupled between each of their jaw and engaging ends, permitting said jaw ends of said first and second handles to move between open and closed positions with respect to each other, said jaw end of said second handle having a jaw face which faces said jaw end of said first handle and a first side and an opposing second side on each side of said jaw face, jaw end of said second handle having a first cavity which extends inwardly from said first side towards said second side and has a portion which opens to said jaw face for receiving a first cutting blade which has a cutting edge which extends outwardly of said jaw face; and a blade assembly comprising:

a first cutting blade disposed in the first cavity of the second handle, the first cutting blade having a cutting edge which extends outwardly of said jaw face of said second handle; and, an insert disposed in the first cavity, the insert having a first side positioned against said first cutting blade to said that a portion of said first cutting blade is positioned between said second handle and said first face of said insert, and said insert having a second side generally opposite to said first side, a second cavity extending into said insert from said second side towards said first cutting blade for receiving at least one second replacement cutting blade therein.

2. The pipe cutter according to claim 1, wherein the blade assembly further comprises a cover plate located at said second side of said insert and at least partially closing said second cavity.

3. The pipe cutter according to claim 2, wherein said jaw face is convex, and further comprising a blade guard member, said blade guard member having a generally planar base and a pair of spaced guards for receiving a portion of said cutting edge of said first cutting blade therebetween, said guards having curved peripheral edges corresponding to said convex jaw face.

4. The pipe cutter according to claim 1, comprising said at least one second replacement cutting blade in said second cavity, wherein the first cutting blade is disposed perpendicular to the at least one second replacement cutting blade.

5. The pipe cutter according to claim 1, further comprising at least one fastener which extends through said insert and into engagement with said second handle to capture said first cutting blade between said insert and said second handle in said first cavity.

6. The pipe cutter according to claim 1, further comprising a biasing member coupled to the second handle and configured to bias the first and second handles toward the closed position.

7. A pipe cutter configured to cut a pipe, the pipe cutter comprising:

a first handle having a jaw end and an engaging end;

a second handle having a jaw end and an engaging end, the first and second handles rotatably coupled between each of their jaw and engaging ends, permitting said jaw ends of said first and second handles to move between open and closed positions with respect to each other, said jaw end of said second handle having a jaw face which faces said jaw end of said first handle and a first side and an opposing second side on each side of said jaw face, jaw end of said second handle having a first cavity which extends inwardly from said first side towards said second side; and a blade assembly comprising:

an insert located in said first cavity, said insert comprising a body having a top surface, a first face and an opposing second face, said top surface forming a portion of said jaw face of said second handle and said second face facing away from said second handle, and a second cavity extending into said second face of said insert, said second cavity configured to accept at least one replacement blade; and a cover, said cover connected to said second handle and at least partially obstructing said second cavity at said second face of said insert;

whereby said pipe cutter is configured to accept a first cutting blade so that a first portion of said first cutting blade is positioned in said first cavity of said second handle between said second handle and said first face of said insert and a second portion of said cutting blade extend outwardly of said jaw face of said second handle towards said first handle, and said second cavity is configured to accept at least one spare second cutting blade for selective access by removing said cover.

8. The pipe cutter according to claim 7, further comprising at least one fastener which has a head and a shank which extends through said cover and said insert and into said second handle.

9. The pipe cutter according to claim 8, further comprising said first cutting blade, wherein said shank extends through an aperture in said first cutting blade.

10. The pipe cutter according to claim 7, wherein said second handle comprises an inset face located in said first cavity, and further comprising said first cutting blade, wherein said first portion of said first cutting blade is located between said inset face of said second handle and said first face of said insert.

11. The pipe cutter according to claim 7, further comprising said first cutting blade and said at least one spare second cutting blade in said second cavity, sat at least one spare second cutting blade located in a plane generally perpendicular to a plane containing said first cutting blade.

12. The pipe cutter according to claim 7, further comprising a blade guard member removably coupled to the second handle and configured to cover a cutting edge of said second portion of said first cutting blade.

13. The pipe cutter according to claim 12, wherein said jaw face is convex, said blade guard member having a generally planar base and a pair of spaced guards for receiving a portion of said cutting edge of said first cutting blade therebetween, said guards having curved peripheral edges corresponding to said convex jaw face.

14. The pipe cutter according to claim 13, wherein the convex jaw face has elevated first and second ends and said base portion engages said first and second ends.

15. The pipe cutter according to claim 7, wherein the cover extends from the second side of the second handle inwardly with respect to the first cavity to the insert.

16. The pipe cutter according to claim 7, further comprising a biasing member coupled to at least one of the first and second handles and configured to bias the first and second handles toward the closed position.

17. The pipe cutter according to claim 16, wherein the biasing member is a spring, and wherein the pipe cutter further comprises a coupling member extending through the spring, the first handle, and the second handle in order to couple to the spring to the first and second handles.

18. The pipe cutter according to claim 7, wherein said jaw face of said second handle is concave and has a first elevated end and a second elevated end, and wherein said top surface of said insert forms a portion of said jaw surface between said first and second elevated ends.

19. The pipe cutter according to claim 18, wherein said insert has first and second ends and said first and second ends are captured in said first cavity beneath said first and second elevated ends of said jaw surface of said second handle.

* * * * *